(12) United States Patent
Horinek et al.

(10) Patent No.: US 12,456,745 B2
(45) Date of Patent: Oct. 28, 2025

(54) PRODUCTION SYSTEM AND METHOD FOR PRODUCING A MEMBRANE ELECTRODE ASSEMBLY

(71) Applicant: CELLCENTRIC GMBH & CO. KG, Kirchheim unter Teck (DE)

(72) Inventors: Volker Horinek, Fellbach (DE); Johannes Deutsch, Fellbach (DE); Fabian Eberspaecher, Stuttgart (DE)

(73) Assignee: CELLCENTRIC GMBH & CO. KG, Kirchheim Unter Teck (DE)

( * ) Notice: Subject to any disclaimer, the term of this patent is extended or adjusted under 35 U.S.C. 154(b) by 623 days.

(21) Appl. No.: 17/907,062

(22) PCT Filed: Feb. 19, 2021

(86) PCT No.: PCT/EP2021/054169
§ 371 (c)(1),
(2) Date: Sep. 22, 2022

(87) PCT Pub. No.: WO2021/190838
PCT Pub. Date: Sep. 30, 2021

(65) Prior Publication Data
US 2023/0104223 A1    Apr. 6, 2023

(30) Foreign Application Priority Data

Mar. 23, 2020   (DE) ...................... 10 2020 203 675.6

(51) Int. Cl.
*H01M 8/1004*   (2016.01)
(52) U.S. Cl.
CPC ................................. *H01M 8/1004* (2013.01)
(58) Field of Classification Search
CPC ............. H01M 8/1004; H01M 8/0273; H01M 8/0297; H01M 8/242; H01M 8/0286; Y02E 60/50; Y02P 70/50; C08J 5/12
See application file for complete search history.

(56) References Cited

U.S. PATENT DOCUMENTS

2019/0109336 A1   4/2019  Shibata

FOREIGN PATENT DOCUMENTS

| DE | 102009059769 | 6/2011 |
| DE | 102016006222 | 12/2016 |

(Continued)

OTHER PUBLICATIONS

International Search Report and Written Opinion for International (PCT) Patent Application No. PCT/EP2021/054169, dated May 3, 2021, 13 pages.

(Continued)

*Primary Examiner* — Helen Oi K Conley
(74) *Attorney, Agent, or Firm* — Sheridan Ross P.C.

(57) ABSTRACT

The invention relates to a production plant for producing a membrane electrode assembly or a membrane electrode frame assembly having multiple work stations in which successive production steps take place. The production plant according to the invention is characterized in that a main line and at least one secondary line are provided, wherein the at least one secondary line branches off from the main line after a central work station and, after at least one decentralized work station in the respective secondary line, reenters the main line before the central work station, wherein the central work station comprises at least one work section for an adhesive application, and wherein at least some of the decentralized work stations are designed at least for joining and/or positioning other materials and/or layers. The invention also comprises a method for producing a membrane electrode assembly or membrane electrode frame assembly using such a production plant.

20 Claims, 2 Drawing Sheets

(56) References Cited

FOREIGN PATENT DOCUMENTS

Figure 1:
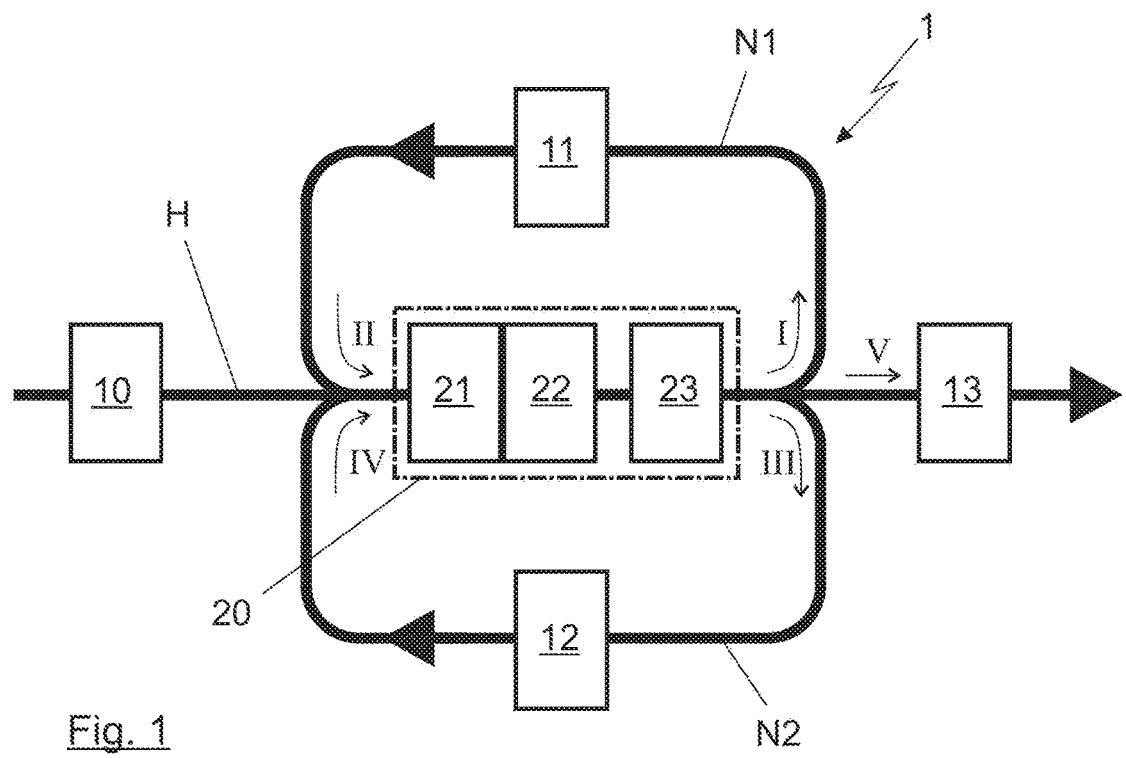
Figure 2:
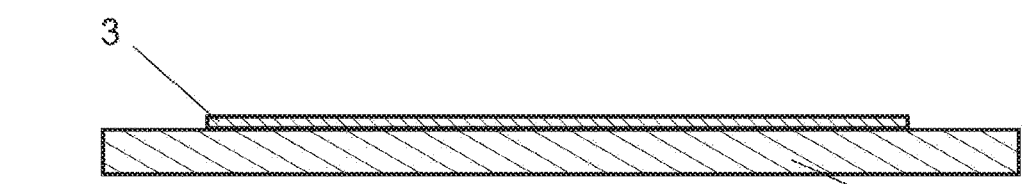
Figure 3:
Figure 4:
Figure 5:
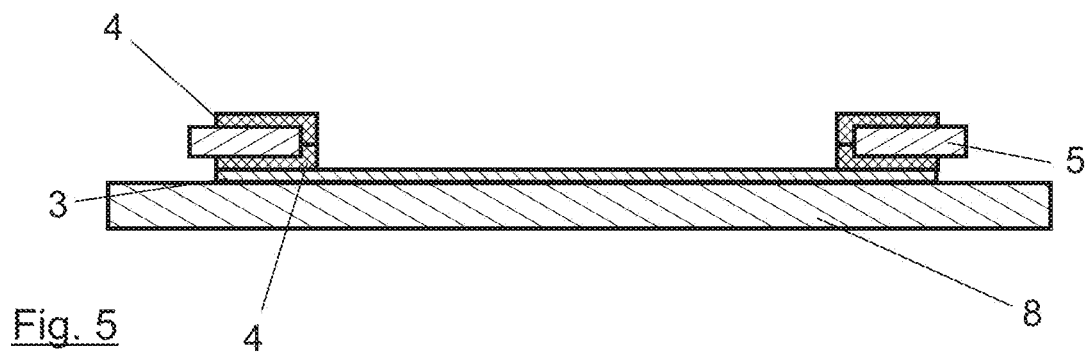

| | | |
|---|---|---|
| DE | 102015010419 | 2/2017 |
| DE | 102015010422 | 2/2017 |
| DE | 102015010440 | 2/2017 |
| DE | 102016000974 | 8/2017 |
| DE | 102016006225 | 11/2017 |
| GB | 2511930 | 9/2014 |
| WO | WO 2013/083144 | 6/2014 |

OTHER PUBLICATIONS

English Translation of the International Search Report for International (PCT) Patent Application No. PCT/EP2021/054169, dated May 3, 2021, 3 pages.

PRODUCTION SYSTEM AND METHOD FOR PRODUCING A MEMBRANE ELECTRODE ASSEMBLY

CROSS REFERENCE TO RELATED APPLICATIONS

This application is a national stage application under 35 U.S.C. 371 and claims the benefit of PCT Application No. PCT/EP2021/054169 having an international filing date of 19 Feb. 2021, which designated the United States, and which PCT application claimed the benefit of German Patent Application No. 10 2020 203 675.6 filed 23 Mar. 2020, the contents of each of which are incorporated herein by reference in their entireties.

The invention relates to a production plant for producing a membrane electrode assembly or a membrane electrode frame assembly according to the preamble of claim 1. The invention also relates to a method for producing such a membrane electrode assembly or membrane electrode frame assembly using such a production plant.

Production plants for producing membrane electrode assemblies are known in principle from the prior art. For example, DE 10 2015 010 440 A1 describes a method and a device for producing a membrane electrode assembly for a fuel cell. In this case, various processing stations are arranged in succession in order to produce the membrane electrode assembly from a plurality of layers and adhesive arranged between them in a more or less continuous production process. DE 10 2016 000 974 A1 also relates to this topic and specifies an alternative device which, however, has a substantially comparable structure, i.e., comprises work stations arranged in succession, in each of which the same work step is carried out.

The construction of such production plants is correspondingly complex and expensive, since different work stations are required several times within the structure.

With regard to further prior art, reference can also be made to a so-called membrane electrode frame assembly, which is known, for example, from DE 10 2015 010 419 A1. Essentially the same technical production principles apply to them with regard to the production.

Reference can also be made to DE 10 2015 010 422 A1 and DE 10 2016 006 225 A1 for further prior art. These documents relate to the printing of adhesive, in particular the digital printing of adhesive for the production of membrane electrode assemblies, wherein the adhesive is applied to various layers which are joined together to form the membrane electrode assembly or the membrane electrode frame assembly or is also applied to previously applied adhesive layers themselves.

The object of the present invention is now to specify an improved production plant for producing membrane electrode assemblies or membrane electrode frame assemblies and a method for producing membrane electrode assemblies using such a production plant.

According to the invention, this object is achieved by a production plant having the features in claim 1, and here in particular in the characterizing part of claim 1. A method for producing a membrane electrode assembly or a membrane electrode frame assembly using such a system results from claim 8. In both cases, preferred embodiments and refinements are specified in the respective subclaims dependent thereon.

The production plant for producing a membrane electrode assembly (MEA) or a membrane electrode frame assembly (MEFA) comprises, comparable to the production plants described in the prior art mentioned at the outset, multiple work stations in which successive production steps take place. The production plant according to the invention is constructed in such a way that a main line and at least one secondary line are provided, wherein the secondary line or lines branch off from the main line after a central work station and reenter the main line after at least one decentralized work station in the respective secondary line, and do so before the central work station. This structure makes it possible to process a semifinished product fed via the main line in the central work station, then redirect it to one of the secondary lines, continue processing the previous structure there, and return it to the main line to process it there again, wherein the two processing steps in the central work station can differ in principle. The production plant according to the invention provides as a central work station one which comprises at least one work section for an adhesive application. The adhesive application can thus preferably always take place in the central work station in the production plant, while further materials or layers are joined and/or positioned in the decentralized work stations, in order to be coated again with another layer of adhesive in the central work station.

This multiple use of the central work station, in which the adhesive is applied, significantly reduces the required investment in the production plant at the same time, since the multiple use of specific parts of the plant is a decisive advantage. This applies in particular to the adhesive application, which can be carried out, for example, by printing methods, which requires a relatively complex and costly central work station, especially if this is equipped with a subsequent measuring station for checking the application, which it can be according to an advantageous refinement of the concept.

In the production plant according to the invention, at least adhesive is thus always applied in the central work station. Depending on the state of processing in which the semifinished product reaches the central work station, the requirement for the adhesive application can be different, however, so that adhesive is applied in different application patterns, for example, depending on whether it has to be applied to a first layer, to a second layer, to a third layer, etc.

The joining in the decentralized work stations comprises, in particular, an application of a further layer to the semifinished product prefabricated to this extent, which has been provided beforehand with adhesive at the desired locations in the central work station, in particular for fastening this applied further layer. The joining can then take place, for example, by means of a robot, preferably at a standstill or possibly also during a movement of a workpiece carrier for the semifinished product. When the semifinished product is at a standstill, positioning or joining via linear axes would also be possible. During the movement, the corresponding joining process can be implemented, for example, via vacuum rollers or by two tool carriers moving one above the other.

According to an extraordinarily favorable refinement of the production plant according to the invention, it can be provided that the adhesive is applied by printing, and here in particular by digital printing. Various printing methods can be used, for example a screen printing method, which is then carried out while the semifinished product is at a standstill and, if necessary, using different screens that correspond to the respective pattern of the required application. The screens can be kept ready in a kind of magazine. Alternatively, a letterpress printing method or intaglio printing method using corresponding stamps would also be conceivable, which, comparable to screen printing methods, requires different template stamps, but has the advantage that it can be carried out while the semifinished product is moving. However, a digital printing process, which can also take place while the semifinished product is moving, is particularly favorable and efficient. The fact is that the required pattern for the respective process step can be selected extremely easily via various stored print templates and can be implemented quickly and easily by digital printing. Possible adjustments to the pattern can also be carried out extremely easily and efficiently here.

A particularly advantageous embodiment of the production plant according to the invention also provides that at least one further decentralized work station is provided in the main line before the outlet or after the branching off of the secondary lines. At least one decentralized work station can thus also be provided at the beginning and at the end of the main line, so that, for example, up to four different work stations can be implemented using two secondary lines, each of which contains one decentralized work station. The materials can then be joined accordingly in these work stations, wherein according to a very advantageous refinement of the production plant according to the invention, at least one of the decentralized work stations has a work section for cutting to size material and/or the produced semifinished product or product. These decentralized work stations can in particular be the first and the last decentralized work station, which, according to the embodiment of the production plant just described, can be arranged, for example, in the main line before the outlet and after the branching off of the secondary lines. In principle, the cutting can take place in various ways, for example by means of a laser. In principle, a shape cut by means of a punching contour or a plotter cutter is also conceivable. In the final work station in particular, side trimming using stationary cutters and, for example, cutting to length using a flying cutter after each individual element is also conceivable, as is also known in principle from productions using continuous successive work stations.

According to a very favorable refinement of the production plant according to the invention, the central work station can comprise a work section for activating or curing the adhesive, in particular in addition to the work section for the adhesive application. Depending on the adhesive material used, such curing or activation can take place, for example, via UV radiation, which is generated by means of a UV LED or a UV medium-pressure lamp. Curing/activation by thermal radiation, electron beams, or the like would be just as conceivable.

According to a further very advantageous embodiment of the production plant according to the invention, it is also provided that the central work station furthermore includes a work section for measuring, for example, the applied adhesive. If there is a problem when applying the adhesive, then after the work section for measuring in the central work station, an intervention can be taken if necessary to stop or correct the further production of the semifinished product or the membrane electrode assembly or membrane electrode frame assembly at this point, so as to minimize the production of discards. If necessary, further values of the adhesive or other dispensed materials can also be measured in the measuring station, for example their shape, their position, or the like.

The method according to the invention for producing a membrane electrode assembly or membrane electrode frame assembly using a production plant in one of the above-described embodiment variants provides that a first layer of a material, and here in particular a first layer of a gas diffusion layer, is fed via the main line, after which in the central work station an adhesive application to the first layer takes place according to a first predetermined pattern, after which the first layer having the adhesive runs through the first secondary line, in which a second layer is applied with a precise fit in a decentralized work station, after which the bonded layers, for example a gas diffusion layer having a bonded frame, again run through the central work station in the main line, in which an adhesive application to the second layer takes place according to a second predetermined pattern, after which this sequence is repeated until all secondary lines have been run through at least once. Various layers, for example a gas diffusion layer, a frame, a catalytically coated membrane, and another gas diffusion layer, can be used by repeatedly running through the central work station to apply the adhesive and respectively running through decentralized work stations to apply the respective next layer in order to produce the membrane electrode assembly or, as mentioned by way of example here, the membrane electrode frame assembly, easily and efficiently.

According to a very favorable embodiment of the method according to the invention, the adhesive application having the pattern matching with the respective layer can take place by digital printing of the pattern currently required depending on the processing status of the layers or the semifinished product, in particular while the semifinished product made up of the layers built up so far moves on the main line. Digital printing makes it extremely easy and efficient to select the pattern that is currently required. This selection can be made, for example, based on the process cycling in the production plant, but it is also possible, for example, to evaluate the respective semifinished product entering the decentralized work station via an optical system, in order to thus identify which pattern has to be applied.

An extraordinarily favorable refinement of the method according to the invention provides for the first layer to be fed into the main line in a cyclic manner so that at least one intermediate product of the membrane electrode assembly or the membrane electrode frame assembly is processed simultaneously using different processing steps in each of the lines, i.e., the main line and the secondary lines. The production plant according to the invention therefore does not have to be used in such a way that a semifinished product travels through the plant until it is finished before the next first layer is fed in. Rather, the cycling can be done in such a way that, for example, a first layer for applying the adhesive according to the first pattern moves via the main line into the decentralized work station, while joining tasks are carried out in the existing secondary lines, the result of which, during the next cycling after the adhesive application to the first layer, then moves into the decentralized work station, so that as much as possible all work stations of the production plant are continuously busy in order to be able to implement short throughput times during the production of the membrane electrode assemblies or membrane electrode frame assemblies.

Further advantageous embodiments of the production plant according to the invention and the method for the operation thereof result from the exemplary embodiment, which is described in more detail hereinafter with reference to the figures.

In the figures:

FIG. 1 shows a schematic structure of the production plant according to the invention in a possible embodiment; and FIG. 2 to FIG. 8 show various processing states of a semifinished product of a membrane electrode frame assembly to be produced.

Figure 8:
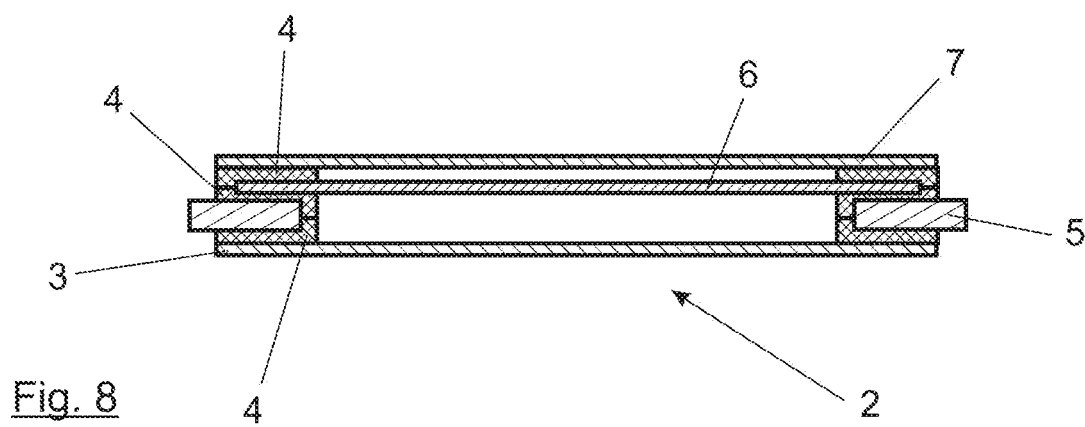

In the illustration of FIG. 1, a production plant denoted in its entirety by 1 can be seen. Membrane electrode assemblies or, in this case, especially membrane electrode frame assemblies 2 are to be produced via this plant. These are also referred to as MEFA 2 according to the English abbreviation. Such a completely produced MEFA 2 is schematically indicated in the illustration of FIG. 8. Seen from bottom to top, the MEFA 2 consists of a first layer denoted by 3, a so-called gas diffusion layer or GDL. A frame denoted by 5 is then adhesively bonded on via an adhesive 4 indicated by cross-hatching. The actual membrane 6 for the fuel cell, which is typically formed as a so-called CCM (catalyst coated membrane) or catalytically coated membrane 6, is then adhesively bonded onto this frame 5 via further adhesive 4. A final layer, denoted by 7 and also formed as a gas diffusion layer or GDL, is then applied via further adhesive 4.

Instead of applying the electrodes to the membrane 6, it would also be conceivable to apply the electrodes to the GDL. A so-called gas diffusion electrode (GDE) thus results. Instead of the described layer structure GDL 7, frame 5, CCM 6, and frame 5, the structure could accordingly also consist of GDE, frame 5, CCM 6, and frame 5. The statements made below also apply to such a structure.

The structure is produced accordingly in the production plant 1 shown in FIG. 1. In a decentralized work station denoted by 10, the first layer 3, i.e., the gas diffusion layer, is applied to a workpiece carrier denoted by 8. This can be seen accordingly in the illustration of FIG. 2. The first layer 3 positioned on the workpiece carrier 8 then arrives in a main line H of the production plant 1 in a central work station 20 of the production plant 1. This central work station 20 comprises three work sections in the exemplary embodiment shown here. The work section denoted by 21 lies first in the direction of the material flow, which provides an application of the adhesive 4 to the respective layer, thus to the first layer 3 in the process step shown in FIG. 3. The adhesive 4 is applied according to a first predetermined pattern, preferably during the movement of the workpiece carrier 8 through the central work station 20, by means of digital printing. In a subsequent work section 22, the adhesive 4 is cured or activated, for example by means of UV radiation, which is applied by UV LEDs. Another optional work section 23 comprises measuring the first layer 3 and in particular the applied adhesive 4.

Figure 6:
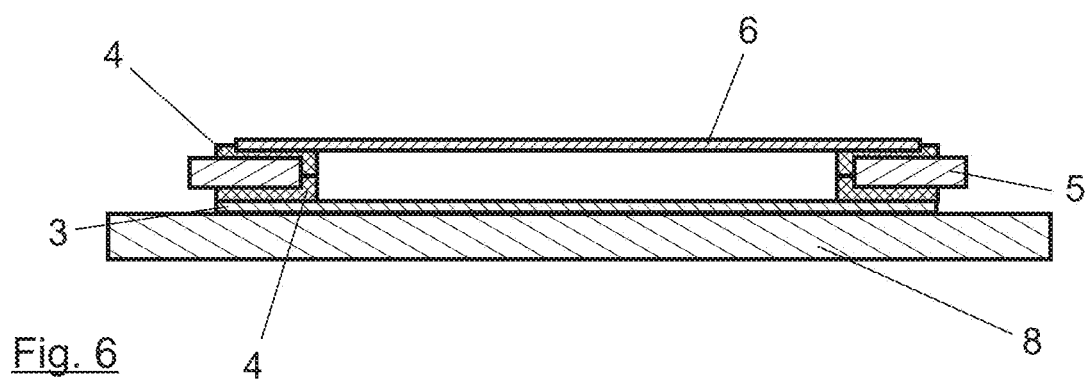
Figure 7:
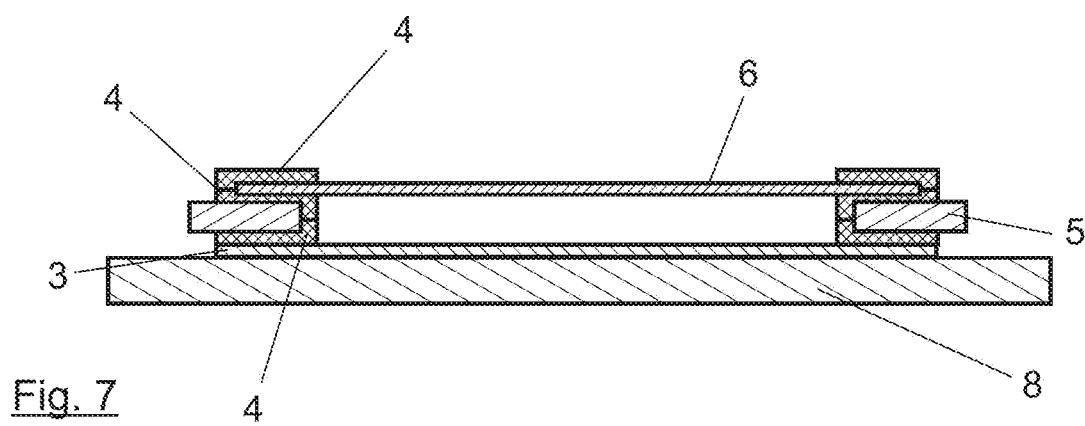

According to the arrow labeled I, the prefabricated product or semifinished product from the first layer 3 having applied adhesive 4 then travels via a first secondary line N1 to a further decentralized work station labeled II. In this decentralized work station, as is indicated in the illustration in FIG. 4, the frame 5 is applied and bonded to the first layer 3 by the adhesive 4 that has already been applied. As indicated by the arrow labeled II, the semifinished product that is manufactured to this point then returns to the central work station 20, in which, as indicated in the illustration in FIG. 5, further adhesive 4 is applied, this time to the existing adhesive 4 and the frame 5. The semifinished product that is manufactured to this point then travels according to the arrow labeled III via a second secondary line N2 of the production plant 1 to a further decentralized work station labeled I2 here. In this, the catalytically coated membrane 6 is applied, as is indicated in the illustration of FIG. 6. After the application of the catalytically coated membrane 6, the semifinished product is also guided here according to arrow IV back to the central work station 20, in which, as can be seen from the illustration in FIG. 7, adhesive 4 is applied again, here to the catalytically coated membrane 6 and partially to the previously applied adhesive 4. After passing through the central work station 20 again, the semifinished product is then passed along the main line H, as indicated by the arrow V, to another decentralized work station 13, in the region of which the final gas diffusion layer 7 is applied in order to complete the structure of the membrane electrode frame assembly 2.

The structure can also be cut to size to its final dimensions, for example in the region of the last-mentioned decentralized work station 13, for example by punching out, by laser cutting, by a plotter cutter or by lateral stationary cutters and a freely swinging cutter, which cuts off the then completed membrane electrode frame assemblies 2 to the correct length. At the end, the already described structure of the membrane electrode frame assembly 2 indicated in the schematic publication of FIG. 8 is then present.

Of course, not only a single semifinished product can run through the production plant simultaneously, as was described. Rather, while the adhesive 4 is being applied to a first layer in the central work station 20, a further first layer 3 can already be positioned on a further workpiece carrier 8 and, for example, in the decentralized work station 11, the frame 5 can be applied to another semifinished product which was previously coated with adhesive. Likewise, a semifinished product can be located in the decentralized work station 12, to which the membrane 6 is applied. All in all, it is only necessary that the cycling takes place in such a way that no collision and no congestion of the semifinished products in front of the respective work stations 20, 10, 11, 12, 13 occurs. With suitable cycling, however, it is possible for just one semifinished product to be processed on the workpiece carrier 8 in each case in all work stations, both in the decentralized work stations 10 to 13 and in the central work station 20, so that the production, in spite of the production plant 1 optimized with regard to the plant investment, can run just as fast as in the case of a continuous production having successive work stations and accordingly three discrete work stations, which correspond in their structure to the central work station 20.

This structure of the exemplary embodiment is to be understood solely as an example in its nature. The sequence could also be reversed, to mention only one possible variation. Likewise, the arrangement of the individual partial lines could be adapted in such a way that access to all modules is made possible, or the like.

The invention claimed is:

1. A production plant for producing a membrane electrode assembly or a membrane electrode frame assembly having multiple work stations in which successive production steps take place,
    characterized in that
    a main line and at least one secondary line are provided, wherein the at least one secondary line branches off from the main line after a central work station and, after at least one decentralized work station in the respective secondary line, reenters the main line before the central work station, wherein the central work station comprises at least one work section for an adhesive application, and wherein at least some of the decentralized work stations are designed at least for joining and/or positioning other materials and/or layers.

2. The production plant as claimed in claim 1, wherein the work section for the adhesive application comprises a device for printing the adhesive.

3. The production plant as claimed in claim 2, wherein
the device for printing the adhesive is designed as a digital printer.

4. The production plant as claimed in claim 1, wherein
in the main line, before the outlet or after the branching off of the at least one secondary line, at least one further decentralized work station is provided.

5. The production plant as claimed in claim 1, wherein
at least one of the decentralized work stations comprises a work section for cutting to size materials and/or the produced semifinished product or the produced membrane electrode assembly or membrane electrode frame assembly.

6. The production plant as claimed in claim 1, wherein
the central work station furthermore comprises a work section for activating/curing the adhesive.

7. The production plant as claimed in claim 1, wherein
the central work station furthermore comprises a work section for measuring at least the applied adhesive.

8. A method for producing a membrane electrode assembly or membrane electrode frame assembly using a production plant as claimed in claim 1, wherein
a first layer is fed via the main line, after which, in the central work station, an adhesive is applied to the first layer according to a first predetermined pattern, after which the first layer having the adhesive runs through a first secondary line, in which, in a decentralized work station, a second layer is joined with a precise fit, after which the bonded layers in the main line again pass through the central work station, in which adhesive is applied to the second layer according to a second predetermined pattern, after which this sequence is repeated until all secondary strands have been run through at least once.

9. The method as claimed in claim 8, wherein
the adhesive is applied having patterns matching the respective layer by digital printing of the pattern that is currently required depending on the processing status of the layers, in particular during a movement of the layers along the main line.

10. The method as claimed in claim 8, wherein
the feeding of the first layer into the main line is cycled in such a way that at least one intermediate product is processed in each of the lines simultaneously using different processing steps.

11. The production plant as claimed in claim 2, wherein in the main line, before the outlet or after the branching off of the at least one secondary line, at least one further decentralized work station is provided.

12. The production plant as claimed in claim 3, wherein in the main line, before the outlet or after the branching off of the at least one secondary line, at least one further decentralized work station is provided.

13. He production plant as claimed in claim 2, wherein at least one of the decentralized work stations comprises a work section for cutting to size materials and/or the produced semifinished product or the produced membrane electrode assembly or membrane electrode frame assembly.

14. He production plant as claimed in claim 3, wherein at least one of the decentralized work stations comprises a work section for cutting to size materials and/or the produced semifinished product or the produced membrane electrode assembly or membrane electrode frame assembly.

15. He production plant as claimed in claim 4, wherein at least one of the decentralized work stations comprises a work section for cutting to size materials and/or the produced semifinished product or the produced membrane electrode assembly or membrane electrode frame assembly.

16. The production plant as claimed in claim 2, wherein the central work station furthermore comprises a work section for activating/curing the adhesive.

17. The production plant as claimed in claim 3, wherein the central work station furthermore comprises a work section for activating/curing the adhesive.

18. The production plant as claimed in claim 4, wherein the central work station furthermore comprises a work section for activating/curing the adhesive.

19. The production plant as claimed in claim 5, wherein the central work station furthermore comprises a work section for activating/curing the adhesive.

20. The production plant as claimed in claim 6, wherein the central work station furthermore comprises a work section for measuring at least the applied adhesive.

* * * * *